3,597,483
PRODUCTION OF 1,2-DIAMINES
Erich Haarer and Hubert Corr, Ludwigshafen (Rhine), and Siegfried Winderl, Heidelberg, Germany, assignors to Badische Anilin- & Soda-Fabrik Aktiengesellschaft, Ludwigshafen (Rhine), Germany
No Drawing. Filed Apr. 8, 1968, Ser. No. 719,686
Claims priority, application Germany, Apr. 13, 1967,
P 15 93 775.4
Int. Cl. C07c 85/02
U.S. Cl. 260—563                                 13 Claims

ABSTRACT OF THE DISCLOSURE

An improved process for the production of 1,2-diamines by reaction of 1,2-epoxides with ammonia, primary amines or secondary amines in the presence of water, hydrogen and hydrogenation catalysts at elevated temperature and superatmospheric pressure wherein the improvement comprises using a supported hydrogenation catalyst having a large internal surface area. The products are suitable as complex-forming substances for heavy metal ions.

---

This invention relates to a process for the production of 1,2-diamines by reaction of 1,2-epoxides with ammonia, primary amines or secondary amines.

It is known from U.S. Pat. No. 3,270,059 that 1,2-diamines are obtained when an alkanolamine or alkylene oxide is reacted with ammonia in the presence of water, hydrogen and a catalyst which contains copper, silver, manganese, iron, nickel or cobalt and which has been sintered, at a pressure of more than 10 atmospheres and at a temperature of 150° to 300° C. The process has the disadvantage that when alkanolamines are used as starting materials they first have to be prepared and this involves additional expenditure. When alkylene oxides are used as starting materials however only part of the alkylene oxide is converted into the 1,2-diamine.

It is an object of this invention to provide an improved process for the production of 1,2-diamines in which 1,2-diamines are obtained in a single stage starting from 1,2-epoxides. A further object of the invention is to provide a process in which the reaction proceeds almost quantitatively.

In accordance with this invention, these and other objects and advantages are achieved in an improved process for the production of 1,2-diamines by reaction of 1,2-epoxides with ammonia, primary amines or secondary amines in the presence of water, hydrogen and hydrogenation catalysts at elevated temperature and superatmospheric pressure, wherein the improvement comprises using hydrogenation catalysts combined with a carrier which have a large internal surface area.

Preferred 1,2-epoxides are aliphatic 1,2-epoxides having two to twelve, particularly two to eight, carbon atoms, cycloaliphatic 1,2-epoxides having five to twelve, particularly six to twelve carbon atoms, or araliphatic 1,2-epoxides having two to twelve carbon atoms, particularly two to eight carbon atoms and one epoxy group in the molecule. Apart from the epoxy group, the preferred 1,2-epoxides have hydrocarbon structure. Preferred cycloaliphatic 1,2-epoxides are derived from six-membered to twelve-membered cycloalkanes. Examples of suitable starting materials are: ethylene oxide, propylene oxide, isobutylene oxide, octene oxide-(1), dodecene oxide-(1), cyclohexene oxide, cyclooctene oxide, cyclododecene oxide and styrene oxide. Ethylene oxide and propylene oxide are preferred as starting materials because of their easy technical accessibility.

Preferred primary or secondary amines have as substituents alkyl radicals having one to six, particularly one to four, carbon atoms or a cyclohexyl radical. Apart from the amino groups, the preferred amines have hydrocarbon structure. Examples of suitable starting amines are: methylamine, butylamine, n-hexylamine, dimethylamine, diethylamine, n-butylmethylamine or cyclohexylamine. Other suitable amines are five-membered to six-membered heterocyclic amines in which the secondary amino group is part of the heterocyclic ring, such as piperidine, pyrrolidine, piperazine and morpholine.

It is advantageous to use 5 to 40 moles of ammonia, primary amine or secondary amine per mole of 1,2-epoxide. Particularly good results are obtained by using 10 to 30 moles of ammonia, primary amine or secondary amine per mole of 1,2-epoxide. The reaction is carried out in the presence of water. It has proved to be advantageous to use 1 to 20% by weight of water with reference to the 1,2-epoxide. It is partciularly advantageous to use water in an amount of 5 to 10% by weight.

The reaction is advantageously carried out at a temperature of from 150° to 240° C. It is preferable to use a temperature of from 160° to 200° C. In general a pressure of from 100 to 300 atmospheres is used. Particularly good results are achieved at pressures of 200 to 280 atmospheres. Pressure in excess of the vapor pressure of the starting materials at the temperature used is achieved by forcing in hydrogen.

Preferred supported catalysts contain the metals: cobalt, nickel, platinum, palladium or ruthenium, particularly cobalt or nickel. The catalysts advantageously contain 50 to 100% by weight, particularly 80 to 100% by weight of the said metals with reference to the metal content of the catalysts. They may also contain activators, such as copper, chromium or manganese, in amounts of 0.1 to 20% by weight, particularly 0.2 to 10% by weight, with reference to the metal content of the catalyst. The catalysts are supported on carriers such as aluminum oxide, silicic acid, silica gel, silicates, titanium dioxide, pumice, coke, carbon, clay or fuller's earth. The finished catalyst contains advantageously 3 to 80% by weight of the said metals. An essential feature of the invention is that the finished catalyst should have a large internal surface area. Preferred catalysts have an inner surface area of 0.1 to 1200 m.²/g., particularly 1 to 500 m.²/g. A further characteristic feature of the finished catalyst is its mean pore radius. It has proved to be favorable for the mean pore radius to be 20 to 10,000 A, particularly 40 to 7000 A. It has furthermore been found that it is advantageous for the catalyst to have a content of an inorganic pyroacid or polyacid, for example of 0.1 to 15% by weight, particularly 1 to 10% by weight, with reference to the finished catalyst. Examples of suitable acids are polyphosphoric acids, tetraboric acid and pyrosulfuric acid or salts of the same. The pyroacids or polyacids are present in the finished catalysts as free acids or as salts with at least one of the metals specified above.

The process according to the invention may be carried out for example by arranging the said catalyst stationarily in a high pressure tube and metering 1,2-epoxide, ammonia, primary amine or secondary amine, water and hydrogen in the ratio described into the top of the high pressure tube while maintaining the said temperature and pressure. The desired diamines may be obtained in pure form from the reaction product by fractional distillation.

The 1,2-diamines prepared by the process according to this invention are suitable for forming complex compounds with heavy metal ions.

The invention is further illustrated by the following example in which the parts specified are parts by weight unless otherwise state. Parts by weight bear the same relation to parts by volume as the kilogram to the liter.

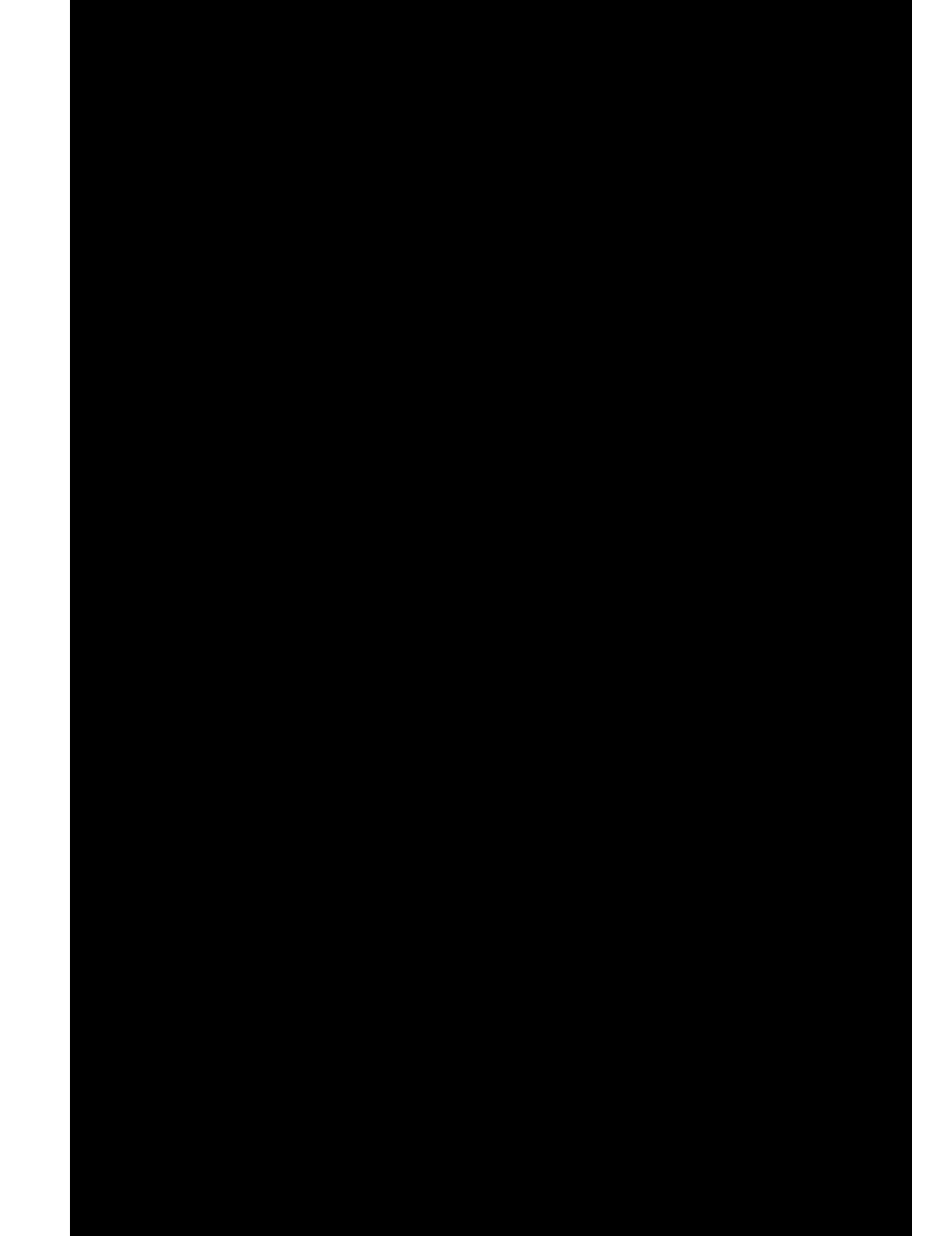

TABLE I.—TABULATION OF DATA OF EXAMPLES 1-13

| Example | Catalyst ratio W:Mo | Temp., °C. | Total air flow, liters/hr. | Feed conc., mole percent p-xylene | Conversion, mole percent | Selectivity, mole percent | |
|---|---|---|---|---|---|---|---|
| | | | | | | Tolualdehyde | Terephthaldehyde |
| 1 | [1] 9:1 | 550 | 500 | .570 | 60.0 | 5.8 | 37.8 |
| 2 | 9:1 | 550 | 275 | .680 | 78.0 | 5.3 | 28.0 |
| 3 | 9:1 | 550 | 125 | 1.08 | 92.0 | 5.2 | 15.0 |
| 4 | 9:1 | 475 | 500 | .606 | 20.0 | 4.9 | 22.5 |
| 5 | [2] 6:4 | 500 | 500 | .529 | 17.3 | 5.8 | 12.0 |
| 6 | 6:4 | 500 | 275 | .619 | 26.7 | 7.0 | 13.5 |
| 7 | 6:4 | 550 | 500 | .561 | 33.0 | 6.9 | 24.6 |
| 8 | 6:4 | 550 | 275 | .660 | 54.3 | 7.6 | 25.6 |
| 9 | 9:1 | 550 | 500 | .740 | 59.3 | 5.5 | 33.2 |
| 10 | 9:1 | 550 | 500 | .740 | [3] 50.6 | 13.1 | 58.6 |
| 11 | 9:1 | 550 | 500 | .615 | 56.4 | 5.25 | 38.6 |
| 12 | 9:1 | 550 | 500 | .615 | [3] 47.2 | 12.9 | 62.3 |
| 13 | [4] 6:1 | 550 | 500 | .730 | 43.8 | 15.7 | 37.0 |

[1] The catalyst was obtained by dissolving 26.0 g. ammonium paratungstate in 600 cc. warmed deionized water. 1.90 g. of ammonium molybdate was added and the clear solution was poured into a flask containing 200 g. Alundum, Norton SA5103, ⅛″ pellets. After heating to dryness in a rotary evaporator, the pellets were dried further in a 250° C. oven followed by calcining at 1,000° F. The percent actives were 10.7% as oxides and 8.65% as active metals.

[2] The catalyst was obtained by dissolving 19.46 g. of ammonium paratungstate in 400 ml. deionized water, accompanied by heating. 8.53 g. of ammonium molybdate was added and then combined with 200 g. Alundum, Norton SA5103, ⅛″ pellets. After heating to dryness in a rotary evaporator, the pellets were dried further in a 250° C. oven followed by calcining at 1,000° F. The catalyst contained 10.6% actives as oxides and 8.65% as active metals.

[3] Based on analysis of the gaseous effluent; all other analyses were obtained from scrub solution analysis.

[4] The catalyst was obtained by dissolving 26.0 g. of ammonium paratungstate in 600 ml. deionized water accompanied by heating followed by the addition of 2.85 g. ammonium molybdate. The solution was combined with 200 g. Alundum, Norton SA5103, ⅛″ pellets and dried in a rotary evaporator. Further drying was achieved in an oven at about 200° C. followed by calcining at 1,000° F. The catalyst contained approximately 10% actives in the form of oxides.

Using the procedure described above except for the replacement of para-xylene by pseudo cumene, triformyl benzene is selectively produced in high yield.

EXAMPLES 14–18

Oxidation of para-xylene to terephthaldehyde

In a further series of experiments, additional catalysts were utilized in the production of terephthaldehyde by the vapor phase oxidation of para-xylene. The catalysts employed consisted of tungsten and molybdenum active oxides deposited on Alundum in the ratios of W:Mo of 6:1 and 20:1, respectively. The same procedure was followed as in the procedure used in the preceding examples except for an improvement in the method of collecting the product. Thus, in the experiments of Examples 14–18, the products were received directly from the reactor into a carboy and the uncondensed portion was collected in two acetone scrubbers placed in line after the carboy.

The results indicated that the para-xylene conversion and selectivity of terephthaldehyde and tolualdehyde production was directly correlated to the percentage of molybdenum present in the tungsten-molybdenum catalyst systems.

The results are set out in Table II below:

TABLE II.—TABULATION OF DATA OF EXAMPLES 14-18

| Example | Catalyst ratio W:Mo | Temp., °C. | Total air flow, liters/hr. | Feed conc., mole percent p-xylene | Conversion, mole percent | Selectivity, mole percent | |
|---|---|---|---|---|---|---|---|
| | | | | | | Tolualdehyde | Terephthaldehyde |
| 14 | 6:1 | 550 | 500 | .652 | 66.72 | 2.89 | 18.53 |
| 15 | 6:1 | 570 | 225 | .894 | 91.13 | 2.96 | 20.58 |
| 16 | 6:1 | 500 | 500 | .993 | 50.37 | 1.69 | 8.43 |
| 17 | [1] 20:1 | 550 | 500 | .553 | 47.41 | 2.74 | 22.93 |
| 18 | 20:1 | 550 | 500 | 1.09 | 23.30 | 7.64 | 28.21 |

[1] The catalyst was prepared by dissolving 26.0 g. ammonium paratungstate in 600 ml. deionized water, accompanied by heating. 0.87 ammonium molybdate was added and combined with 200.0 g. Alundum, Norton SA1503, ⅛″ pellets. After heating to dryness in a rotary evaporator, the plelets were dried further in a 250° C. oven, followed by calcining at 1,000 F.

EXAMPLES 19–26

Oxidation of toluene to benzaldehyde

These examples were carried out in a 2 foot long, 1 inch stainless steel tube reactor. The feed consisted of an air-toluene mixture which was produced by bubbling air through toluene. The toluene concentration was maintained at 0.77 to 1.55 mole percent by mixing the aspirated stream with additional air. In the system 38 cc. of the catalyst (having a tungsten-molybdenum ratio of 9:1) was packed on the top of a 50 cc. alumina filler and the reaction was conducted at 590° C. The results are set out in Table III below.

TABLE III.—OXIDATION OF TOLUENE TO BENZALDEHYDE—TABULATION OF DATA OF EXAMPLES 19-26

| Example | Toluene | | | Air flow, liters/hr. | Benzaldehyde selectivity | |
|---|---|---|---|---|---|---|
| | Feed mol, percent | Recovery, mol | Conversion, percent | | Mol | percent |
| 19 | 1.07 | .896 | 16.36 | 250 | .120 | 68.9 |
| 20 | 0.777 | .471 | 39.38 | 125 | .233 | 76.1 |
| 21 | 0.777 | .536 | 31.02 | 125 | .158 | 65.5 |
| 22 | 0.084 | .631 | 24.88 | 125 | .154 | 73.6 |
| 23 | 0.840 | .654 | 22.14 | 125 | .165 | 88.7 |
| 24 | 1.550 | 1.153 | 25.61 | 125 | .237 | 59.69 |
| 25 | 1.076 | 0.857 | 20.35 | 125 | .172 | 78.53 |
| 26 | 1.076 | 0.813 | 24.44 | 125 | .210 | 79.84 | heated up to the reaction temperature. The reaction is carried out during from five minutes to four hours under the said conditions, the mixture is cooled and the end product is separated by a conventional method, for example by fractional distillation. The reaction may be carried out continuously or batchwise.

The unsaturated oxo compounds which can be prepared by the process of the invention are valuable intermediates for the production of perfumes.

The invention is illustrated by the following examples.

EXAMPLE 1

300 g. of 2,6,6-trimethyl-5,6-dihydro-4H-pyran and 5 g. of water are forced into a high pressure autoclave heated to 290° C. The mixture is kept at an autogenous pressure of 90 atmospheres for twenty-five minutes at 290° C. The mixture is then passed into a high pressure separator, cooled therein and then subjected to fractional distillation. Besides 16 g. of unreacted 2,6,6-trimethyl-5,6-dihydro-4H-pyran having a boiling point of 130° to 131° C. there is obtained 256 g. of a mixture of 6-methylhept-6-en-2-one and 6-methylhept-5-en-2-one having a boiling point of 170° C. at 760 mm. (equivalent to 90% of the theory with reference to reacted starting pyran).

EXAMPLE 2

150 g. of 2,6,6-trimethyl-5,6-dihydro-4H-pyran, 4 g. of water and 200 g. of benzene are forced into an autoclave which has been preheated to 300° C. The reaction mixture is left at 300° C. and 80 atmospheres for forty-five minutes, then separated through a high pressure separator and processed by fractional distillation. 11 g. of unreacted dihydropyran and 127 g. (equivalent to 92.7% of the theory with reference to reacted starting pyran) of a mixture of methylheptenones as in Example 1 are obtained.

EXAMPLE 3

100 g. of 6-methyl-6-neopentyl-5,6-dihydropyran, 4 g. of water and 300 g. of benzene are forced into a reactor preheated to 300° C. The mixture is then left at this temperature and at 100 atmospheres for one hour. The mixture is separated and worked up in the manner described in Example 2. 16 g. of unreacted 6-methyl-6-neopentyl-5,6-dihydro-4H-pyran having a boiling point of 106° to 109° C. at 50 mm. and 70 g. (87.5% of the theory with reference to reacted starting pyran) of a mixture of 5-methyl-7-dimethyloct-4-en-1-al and its isomers (the corresponding 5-ene compound and of 5-methyleneoctane) having a boiling point of 52° to 54° C. at 2 mm. are obtained.

We claim:

1. A process for the production of olefinically unsaturated oxo compounds containing the carbon-carbon double bond in gamma-delta or delta-epsilon position to the oxo group, which process comprises heating 5,6-dihydro-4H-pyran substituted by one to three alkyl groups wherein said alkyls have one to five carbon atoms, at least one of said alkyl substituents being attached in the 6-position, with 0.1 to 10% by weight of water, with reference to the amount of the dihydropyran, at a pressure of 10 to 300 atmospheres and at a temperature of 280° to 350° C.

2. A process as claimed in claim 1 wherein the amount of water is 0.1 to 3% by weight of the amount of dihydropyran.

3. A process as claimed in claim 1 wherein the reaction is carried out at a temperature of from 290° to 300° C.

4. A process as claimed in claim 1 carried out at a pressure of from 25 to 100 atmospheres.

5. A process as claimed in claim 1 wherein the 5,6-dihydro-4H-pyran used bears one alkyl group having one to five carbon atoms as a substituent.

6. A process as claimed in claim 1 wherein the 5,6-dihydro-4H-pyran bears two alkyl groups having one to five carbon atoms as substituents.

7. A process as claimed in claim 1 wherein the 5,6-dihydro-4H-pyran used bears three alkyl groups having one to five carbon atoms as substituents.

8. A process as claimed in claim 1 wherein the initial dihydropyran reactant is 2,6,6-trimethyl-5,6-dihydro-4H-pyran.

9. A process as claimed in claim 1 wherein the initial dihydropyran reactant is 6-methyl-6-neopentyl-5,6-dihydro-4H-pyran.

References Cited

UNITED STATES PATENTS

| | | | |
|---|---|---|---|
| 2,515,304 | 7/1950 | Jones. | |
| 2,624,764 | 1/1953 | Emerson et al. | 260—593 |

FOREIGN PATENTS

| | | | |
|---|---|---|---|
| 521,929 | 2/1956 | Canada | 260—593 |

OTHER REFERENCES

Meinwald et al. J. Amer. Chem. Soc., vol. 80, 5266–5270.

W. B. LONE, Assistant Examiner

BERNARD HELFIN, Primary Examiner

U.S. Cl. X.R.

260—601

UNITED STATES PATENT OFFICE
CERTIFICATE OF CORRECTION

Patent No. 3,597,485  Dated  August 3, 1971

Inventor(s) William F. Brill

It is certified that error appears in the above-identified patent and that said Letters Patent are hereby corrected as shown below:

Column 5, Table I, for the text of Footnote 3, read the text of Footnote 4 set forth, and for the text of Footnote 4, read the text of Footnote 3 set forth.

Column 5, line 26, for "drynig" read - - drying - - .

Column 5, line 48, for "plelets" read - - pellets - - .

Column 7, line 16, for "0.10" read - - 0.01 - - .

Signed and sealed this 16th day of May 1972.

(SEAL)
Attest:

EDWARD M. FLETCHER, JR.  ROBERT GOTTSCHALK
Attesting Officer  Commissioner of Patents